United States Patent [19]

Clarke

[11] Patent Number: 5,388,175
[45] Date of Patent: Feb. 7, 1995

[54] OPTICAL CABLE HAVING POWDER EMBEDDED IN PLASTIC SURFACES

[75] Inventor: Mary A. Clarke, Granite Falls, N.C.
[73] Assignee: Siecor Corporation, Hickory, N.C.
[21] Appl. No.: 186,082
[22] Filed: Jan. 25, 1994
[51] Int. Cl.⁶ .................................................. G02B 6/44
[52] U.S. Cl. ..................... 385/100; 385/102; 385/109; 385/114; 385/128
[58] Field of Search ............... 385/100, 101, 102, 103, 385/109, 113, 114, 123, 128

[56] References Cited

U.S. PATENT DOCUMENTS

| | | | |
|---|---|---|---|
| 3,538,235 | 11/1970 | Arendt et al. | 174/23 C |
| 4,401,366 | 8/1983 | Hope | 385/110 |
| 4,525,026 | 6/1985 | Elion | 385/141 |
| 4,596,443 | 6/1986 | Diemeer et al. | 385/110 |
| 4,718,747 | 1/1988 | Bianchi et al. | 385/128 |
| 4,725,122 | 2/1988 | Anelli et al. | 385/100 |
| 4,765,711 | 8/1988 | Obst | 385/103 |
| 4,767,184 | 8/1988 | Ogasawara et al. | 385/105 |
| 5,039,197 | 8/1991 | Rawlyk | 385/102 |
| 5,181,268 | 1/1993 | Chien | 385/128 |
| 5,261,021 | 11/1993 | Pasta et al. | 385/100 |
| 5,321,788 | 6/1994 | Arroyo et al. | 385/109 |

Primary Examiner—Frank Gonzalez
Attorney, Agent, or Firm—J. David Abernethy

[57] ABSTRACT

A light waveguide cable having powder embedded in the outer surfaces of plastic material such as central members, open ribbon carriers, or buffer tubes. Powder is deposited during the extrusion or after subsequent reheating.

12 Claims, 5 Drawing Sheets

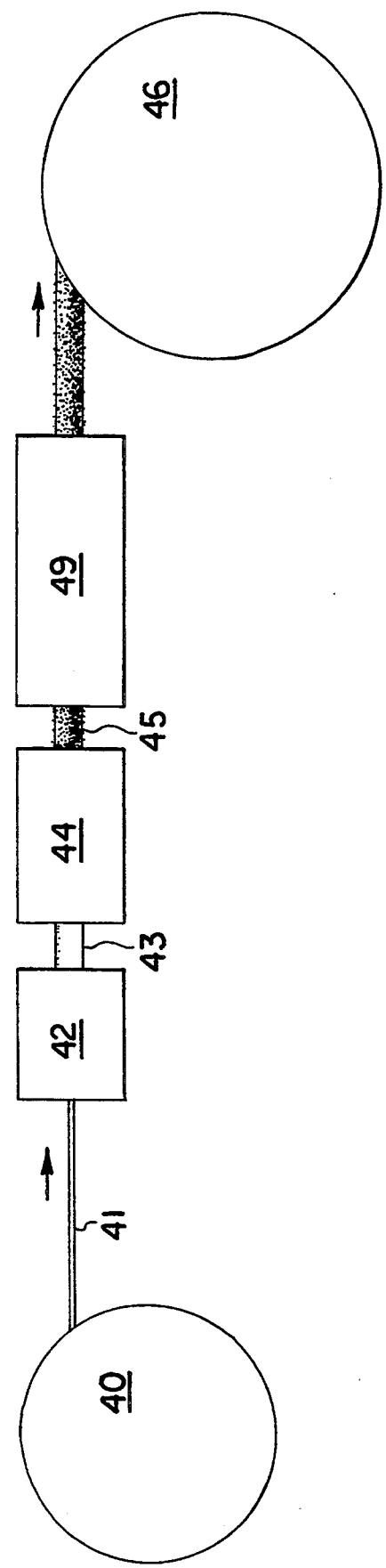

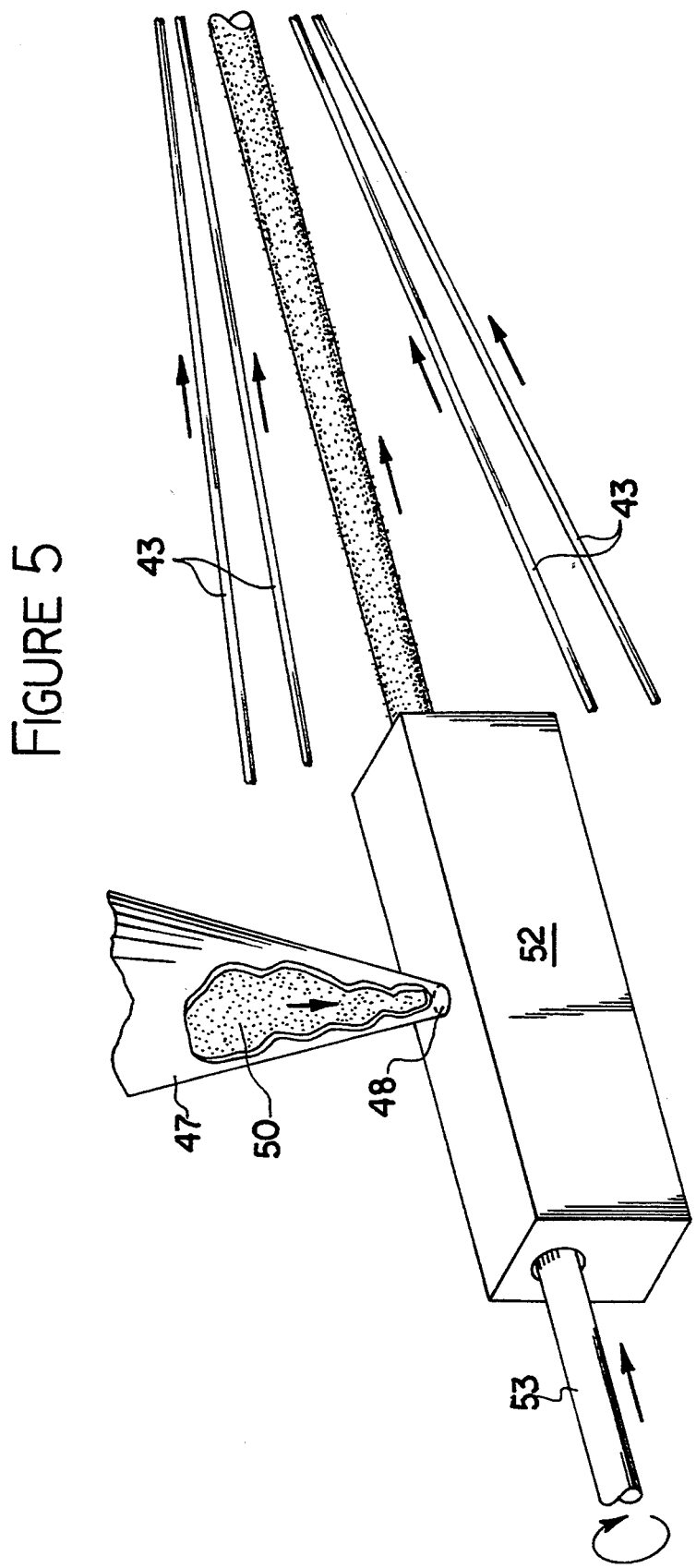

OPTICAL CABLE HAVING POWDER EMBEDDED IN PLASTIC SURFACES

BACKGROUND OF THE INVENTION

The field of the invention is optical waveguide cables.

Optical waveguide cables have included powders therein designed to perform various functions such as absorbing or blocking water and inhibiting the propagation of flames or toxic smoke along a cable. The prior art discloses a number of methods to place such powders into cables. Arendt, et al., U.S. Pat. No. 3,538,235, discloses placing of a powder in a suspension in a highly volatile liquid forced into a cable under pressure. The powder mixture contains a 2% bonding agent such as polyisobutylene. Several prior art disclosures teach simply mixing the powder with plastic pellets in order that the powder be generally mixed in the plastic article to be extruded from the pellets; such is disclosed by Ogasawara et al., U.S. Pat. No. 4,767,184; and Anelli et al, U.S. Pat. No. 4,725,122. Hope, U.S. Pat. No. 4,401,366, discloses the application of powder with the aid of an electrostatic field. Other prior art patents, such as Anelli et al., U.S. Pat. No. 4,725,122, and Elion, U.S. Pat. No. 4,525,026, disclose the use of adhesives. Rawlyk, U.S. Pat. No. 5,039,197, discloses the use of heat curing.

It is believed that, for many cables, the most efficient use of powder in a plastic structure is to embed the powder only in the outer surface of the plastic article. The prior art has normally used adhesives to accomplish this purpose. Therefore, it is believed that the art would be advanced by cables and methods for making such cables involving the embedding of powders only in the outer surface of plastic articles and without having to deal with adhesives.

SUMMARY OF THE INVENTION

The present invention provides for cables having at least one light waveguide and a powder therein. The powder may be water absorbent or flame retardant, or a mixture of water absorbent and flame retardant materials. The powder is embedded only in the outer surface of a plastic cable component. The cable component may be a plastic receptacle, such as a tube or open ribbon carrier enclosing a light waveguide, or the plastic structure may be a central member. No adhesives are applied on the powder or the outer surface of the plastic component. The powder may be embedded onto the outer surface of the plastic component either by depositing the powder on the component surface immediately after melt extrusion of the plastic surface and prior to complete cooling thereof after melt extrusion; or, in the alternative, by heating the surface of the plastic component, depositing the powder on the outer surface thereof to embed the powder in the surface, and thereafter cooling the plastic with the powder embedded on the outer surface thereof. The plastic material should in any case be thermoplastic rather than thermosetting. In the case of the open ribbon carrier, the powder is embedded only in the outer surface thereof not adjacent to the light waveguides held therein. One or more coated light waveguides may be contained within a tube or open ribbon carrier having the powder embedded therein, or optical fiber ribbons may be used instead of individual coated optical fibers.

BRIEF DESCRIPTION OF THE DRAWINGS

The detailed description is made with reference to the drawings, which include the following figures:

FIG. 4 is a schematic view of a first process for practicing the invention; and, FIG. 5 is a schematic view of a second process for practicing the invention.

DETAILED DESCRIPTION OF THE PREFERRED EMBODIMENT

Figure 1:
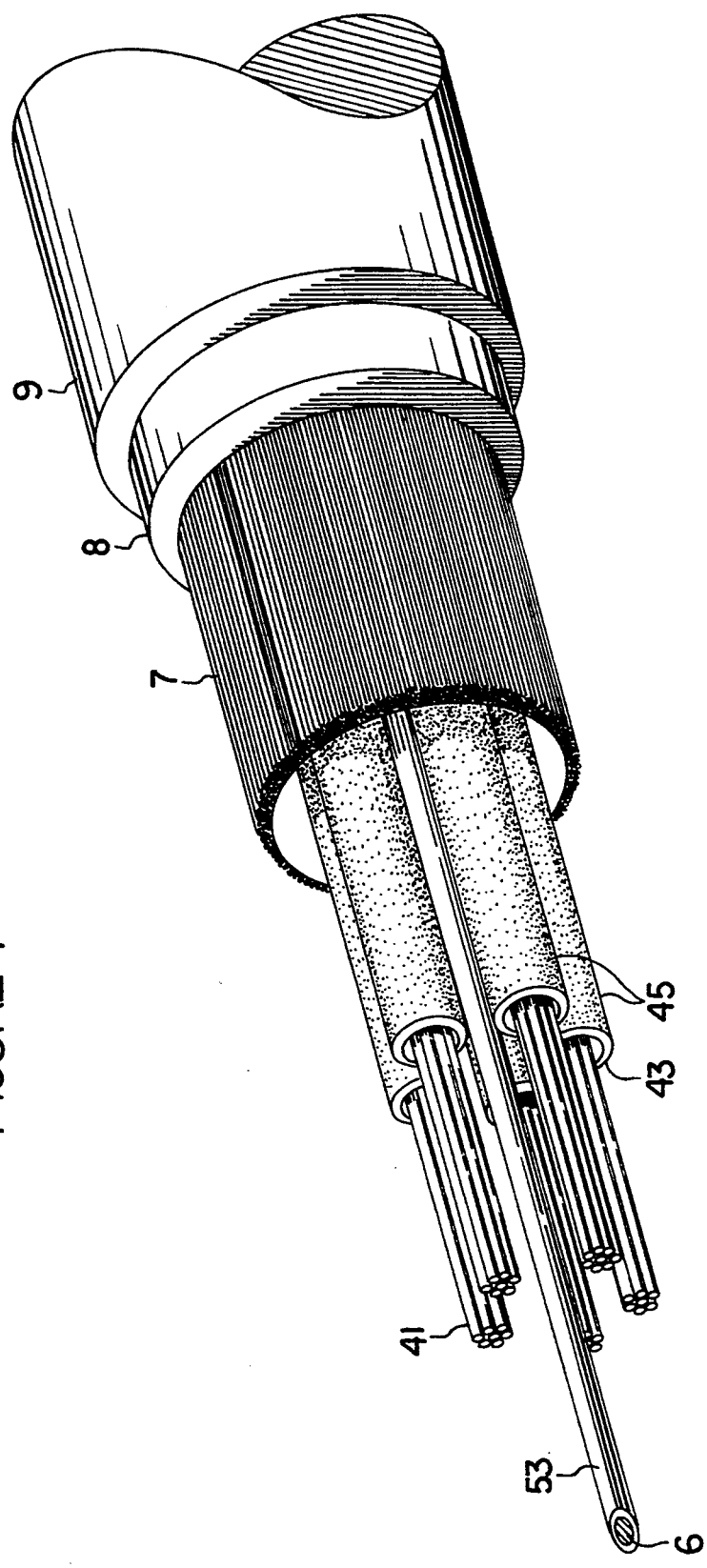
FIG. 1 is a perspective view of a light waveguide cable according to the invention having powder embedded on the outer surface of the buffer tubes.

FIG. 1 detects a buffer tube type light waveguide cable according to the invention. A central member 6 having a plastic coating 53 thereon is surrounded by thermoplastic buffer tubes 43, which may be laid straight or stranded as desired. Buffer tubes 43 may be stranded with an alternating direction of lay. Contained in each buffer tube 43 are bundles of light waveguides 41. Light waveguide ribbons could also be used in buffer tubes 43 if desired. Buffer tubes 43 each have powder 45 embedded in the outer surface thereof. The powder may be used for flame retardance, water absorbence, or both. Surrounding buffer tubes 43 is a layer of aramid fiber 7 and intermediate tube 8 and outer sheath 9, respectively. Intermediate tube 8 may be replaced by different cable elements as called for by the design, including tapes, welded metallic tubes, or fiberglass impregnated strength members or combinations thereof.

Figure 2:
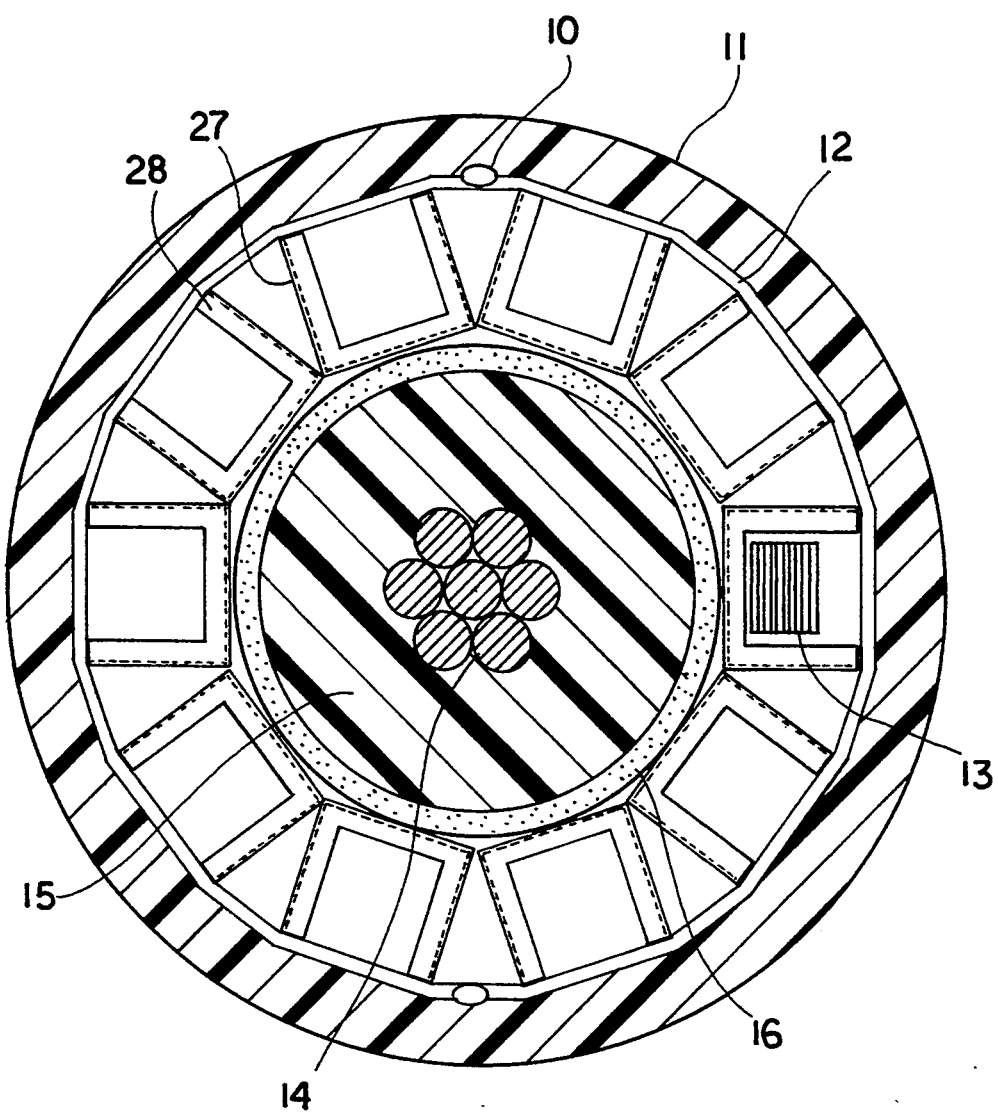
FIG. 2 is a sectional view of a light waveguide ribbon cable according to the invention having powder deposited on the outer surface of open ribbon carders and plastic coating on the central member.
Figure 3:
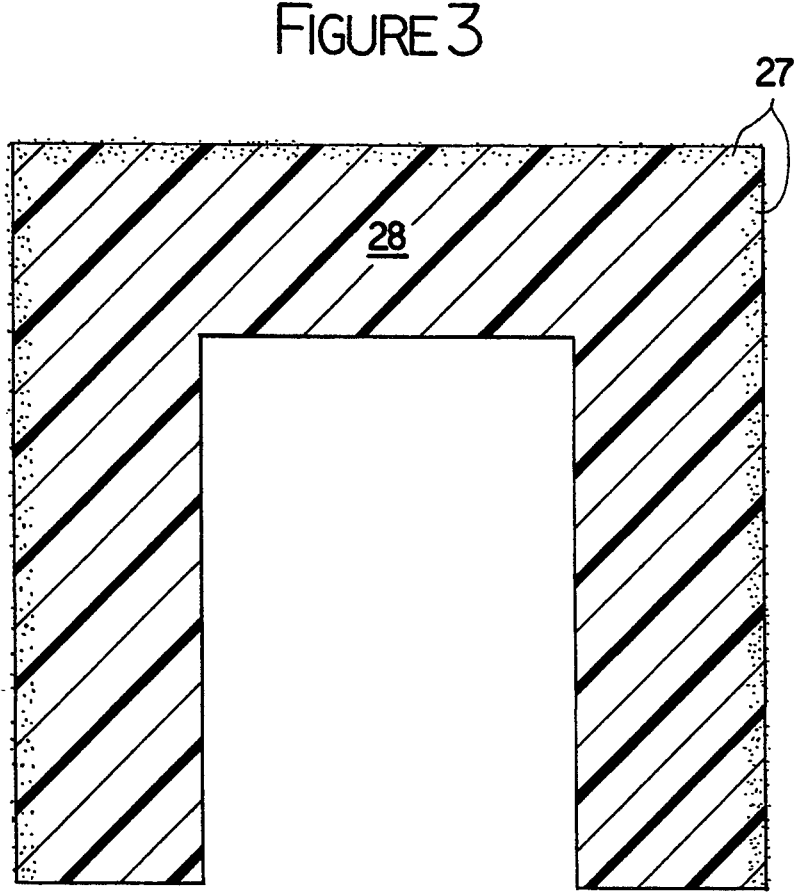
FIG. 3 is an expanded sectional view of an open ribbon carrier according to the invention.

A ribbon light waveguide cable according to the invention is depicted in FIG. 2. Its central member has a core of stranded steel wires 14, a plastic coating 15 thereon, and powder 16 embedded in the exterior surface thereof. The core is surrounded by a layer of thermoplastic open ribbon carriers 28 each having powder 27 embedded in the exterior surfaces thereof not adjoining light waveguide ribbons 13 held therein. The open ribbon carriers 28 are overlaid by a tape 12, ripcord 10, and outer sheath 11. FIG. 3 depicts an expanded view of an open ribbon carrier 28 according to the invention.

A first process for practicing the invention involves melt extruding a thermoplastic receptacle such as a buffer tube 43 enclosing at least one light waveguide 41, thereafter depositing a powder 45 on the receptacle surface prior to complete cooling thereof in the absence of an adhesive on the powder 46 or the receptacle surface 43; and thereafter cooling the receptacle surface to embed the powder in the receptacle surface. This process is depicted in FIG. 4. An optical fiber 41 is paid off from spool 40. A plastic buffer tube 43 is extruded over light waveguide 41 by melt extruder 42. Immediately following extrusion, buffer tube 43 proceeds through a coating unit 44 in which a powder 45 is deposited on the outer surface of plastic buffer tube 43. Depositing may take place through powder 45 being swirled about the buffer tube 43 in a partial vacuum, by electrostatic deposition, or both. A Nordson compact cable coater may be used for this purpose. After powder 45 is deposited on the outer surface of buffer tube 43, the cable proceeds through a cooling area 49 which may consist of a compressed gas. The completed buffer tube is then taken up by a sheave 46.

A second embodiment for practicing the invention is shown in FIG. 5. Here, the central member having an outer thermoplastic coating 53 thereon is drawn while rotating through chamber 52. Powder 50 is drawn through chamber 52 by means of a partial vacuum, excess powder 50 being recycled back to hopper 47 through a powder circulating system. As powder 50 is drawn into chamber 52, nozzle 48 of hopper 47 is heated. The heat briefly softens the outer surface of central member 53 long enough for the powder 50 to be embedded in the outer surface thereof. Afterwards, buffer tubes 43 may be stranded about the completed and cooled central member.

Those skilled in the art will appreciate that the foregoing descriptions and figures are merely illustrative, and that there are many variations for practicing the invention using other cable designs; for instance, the central member in FIG. 5 could be a slotted core. Such variations within the scope of the claims are considered to be within the scope and spirit of the invention.

All of the preferred methods and cables utilize no adhesives either on the powders or the plastic surfaces onto which the powders are embedded.

What is claimed is:

1. A light waveguide cable, comprising:
   a central member having a powder embedded only in the outer surface thereof in the absence of an adhesive on such surface;
   an outer sheath; and,
   at least one light waveguide between the outer sheath and the central member.

2. A light waveguide cable as described in claim 1 wherein the powder is water absorbent.

3. A light waveguide cable as described in claim 1 wherein the powder is flame retardant.

4. A light waveguide cable as described in claim 1, wherein the powder is a mixture of water absorbent and flame retardant materials.

5. A light waveguide cable, comprising:
   a light waveguide;
   a thermoplastic tube holding the light waveguide, the thermoplastic tube having a powder embedded only in the outer surface thereof in the absence of an adhesive on such surface; and,
   an outer sheath holding the thermoplastic tube.

6. A light waveguide cable as described in claim 5 wherein the powder is water absorbent.

7. A light waveguide cable as described in claim 5 wherein the powder is flame retardant.

8. A light waveguide cable as described in claim 5 wherein the powder is a mixture of water absorbent and flame retardant materials.

9. A light waveguide cable, comprising:
   a light waveguide ribbon;
   a thermoplastic open ribbon carrier holding the light waveguide, the open ribbon carrier having a powder embedded only in the outer surface thereof not adjacent to the light waveguide ribbon in the absence of an adhesive on such surface; and,
   an outer sheath holding the open ribbon carrier.

10. A light waveguide cable as described in claim 9 wherein the powder is water absorbent.

11. A light waveguide cable as described in claim 9 wherein the powder is flame retardant.

12. A light waveguide cable as described in claim 9 wherein the powder is a mixture of water absorbent and flame retardant materials.

* * * * *